US008010359B2

(12) United States Patent
Matsuo

(10) Patent No.: US 8,010,359 B2
(45) Date of Patent: Aug. 30, 2011

(54) SPEECH RECOGNITION SYSTEM, SPEECH RECOGNITION METHOD AND STORAGE MEDIUM

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1649 days.

(21) Appl. No.: 11/165,120

(22) Filed: Jun. 24, 2005

(65) Prior Publication Data

US 2006/0212291 A1 Sep. 21, 2006

(30) Foreign Application Priority Data

Mar. 16, 2005 (JP) ................................ 2005-075924

(51) Int. Cl.
*G10L 15/04* (2006.01)

(52) U.S. Cl. ........ 704/251; 704/231; 704/246; 704/247; 704/252

(58) Field of Classification Search ........................ None
See application file for complete search history.

(56) References Cited

U.S. PATENT DOCUMENTS

| | | | | |
|---|---|---|---|---|
| 6,397,181 | B1 * | 5/2002 | Li et al. | 704/256.4 |
| 2002/0150263 | A1 * | 10/2002 | Rajan | 381/92 |
| 2003/0195748 | A1 * | 10/2003 | Schalkwyk | 704/231 |
| 2003/0228007 | A1 * | 12/2003 | Kurosaki | 379/142.06 |
| 2004/0052218 | A1 * | 3/2004 | Knappe | 370/260 |
| 2004/0161094 | A1 * | 8/2004 | Martin et al. | 379/218.01 |
| 2004/0166832 | A1 * | 8/2004 | Portman et al. | 455/412.1 |
| 2006/0106613 | A1 * | 5/2006 | Mills | 704/270 |
| 2009/0030552 | A1 * | 1/2009 | Nakadai et al. | 700/258 |

FOREIGN PATENT DOCUMENTS

| | | |
|---|---|---|
| JP | 06-186996 | 7/1994 |
| JP | 10-322450 | 12/1998 |
| JP | 11-282485 | 10/1999 |
| JP | 2000-310999 | 11/2000 |
| JP | 2001-5482 | 1/2001 |
| JP | 2003-114699 | 4/2003 |
| JP | 2004-333641 | 11/2004 |

OTHER PUBLICATIONS

Japanese Office Action dated Mar. 3, 2009 with its English translation.

* cited by examiner

*Primary Examiner* — Leonard Saint Cyr
(74) *Attorney, Agent, or Firm* — Kratz, Quintos & Hanson, LLP

(57) ABSTRACT

Provided are a speech recognition system, a method and a storage medium capable of, even in a case where plural speakers input superimposed speeches, recognizing a speech of an individual each speaker and making a single application program sharable among the speakers in execution. In a speech recognition system receiving speeches of plural speakers to execute a predetermined application program, the received speeches are separated according to the respective speakers if necessary, the received speeches of individual speakers are speech-recognized, results of speech recognition are matched with data items necessary for executing the application program, one of results of recognition of plural speeches which are found as a result of the matching to be overlapping is selected, and the results of recognition of plural speeches which are found as a result of the matching not to be overlapping are linked to the selected result of speech recognition.

17 Claims, 5 Drawing Sheets

FIG. 4A

| ARRIVAL POINT | EVALUATION VALUE |
|---|---|
| OSAKA STATION | 465 |
| SHIN-OSAKA STATION | 482 |

FIG. 4B

| PASSAGE POINT | EVALUATION VALUE |
|---|---|
| SANNOMIYA | 451 |
| NISHI-AKASHI | 493 |

SPEECH RECOGNITION SYSTEM, SPEECH RECOGNITION METHOD AND STORAGE MEDIUM

CROSS-REFERENCE TO RELATED APPLICATIONS

This Nonprovisional application claims priority under 35 U.S.C. §119(a) on Patent Application No. 2005-75924 filed in Japan on Mar. 16, 2005, the entire contents of which are hereby incorporated by reference.

BACKGROUND OF THE INVENTION

The invention relates to a speech recognition system, a speech recognition method and a storage medium in which a single application program can be executable based on speeches of plural speakers.

In recent years, there has been a rapid growth in various applications using an auto speech recognition (ASR) system. For example, by applying an auto speech recognition system to a car navigation system, various effects are produced, such as that a car can certainly arrives at a destination while safety in driving is secured.

On the other hand, since such an auto speech recognition system automatically responds to a user speech, the system is likely to cause wrong recognition in a case where speeches of plural users are simultaneously inputted, resulting in difficulty in executing an application program so as to meet to user's intention. In this case, a direction from which a received speech is inputted is determined based on the received speech, and a speaker is specified based on a characteristic quantity of the speech or the like and speech recognition is performed on only the speech delivered by the specified speaker, thereby enabling a speech recognition application program to be executed without wrong recognition of the received speech.

For example, disclosed in Japanese Patent Application Laid-Open No. 2001-005482 is a speech recognition apparatus with a construction in which a speaker is specified by analyzing a speech, optimal recognition parameters are prepared for each specified speaker and the parameters are sequentially optimized according to a speaker, and with such an apparatus, speeches of plural speakers, even if being inputted alternately, are not confused in recognition, thereby enabling an application program to be executed.

Moreover, disclosed in Japanese Patent Application Laid-Open No. 2003-114699 is a car-mounted speech recognition system in which speeches of plural speakers are received by a microphone array, the received speeches are separated into speech data of individual speakers, and thereafter, speech recognition is conducted on the separated speech data. With such a system adopted, for example, in a case where speakers take a driver's seat, a passenger seat and the like, respectively, it is possible that speech data is collected while a directivity characteristic range of the microphone array is changed with ease to recognize a speech of each of the speakers, thereby enabling a significant reduction in occurrence of wrong recognition.

BRIEF SUMMARY OF THE INVENTION

The invention has been made in light of such circumstances and it is an object of the invention to provide a speech recognition system, a speech recognition method and a storage medium capable of, even in a case where plural speakers input superimposed speeches, recognizing a speech of an individual speaker and making a single application program sharable among the speakers in execution.

A speech recognition system pertaining to a first invention, in order to achieve the object, is directed to a speech recognition system wherein speeches of plural speakers are received and a predetermined application program is executed based on results of speech recognition of the received speeches, including: speech recognition means for speech-recognizing a speech received from each speaker; matching means for matching the results of speech recognition with data items necessary for executing the application program; selecting means selecting one of the results of recognition of plural speeches which are found as a result of the matching to be overlapping in a data item necessary for executing the application program; and linkage means for linking the selected result of speech recognition with the results of recognition of the plural speeches which are found as a result of the matching not to be overlapping in data items necessary for executing the application program.

A speech recognition system pertaining a second invention is directed to a speech recognition system of the first invention wherein the speech recognition means calculates an evaluation value representing a degree of coincidence with a speech pattern stored in advance and outputs a character sequence having a largest calculated evaluation value as a result of recognition, and the selecting means selects a result of speech recognition having the largest evaluation value among results of speech recognition of superimposed plural speeches.

A speech recognition system pertaining to third or fourth invention is directed to a speech recognition system of the first or second invention wherein the selecting means preferentially selects a result of speech recognition of a speech uttered later.

A speech recognition system pertaining to a fifth invention is directed to a speech recognition system of any of the first to fourth inventions wherein a priority level indicating a priority in selection of a result of speech recognition for an individual each speaker is stored or a priority level is specified in order of utterance and the selecting means preferentially selects a result of speech recognition of a speech uttered by a speaker with a highest priority level.

A speech recognition system pertaining to a sixth invention is directed to any of the first to fifth inventions, further including: speech separation means for separating received speeches according to the respective speakers.

A speech recognition system pertaining to a seventh invention is directed to a speech recognition system receiving speeches of plural speakers to execute a predetermined application program based on results of recognition of the received speeches, comprising a processor capable of performing the operations of speech-recognizing received speeches of individual speakers; matching results of speech recognition in a data item necessary for executing the application program; selecting one of results of recognition of plural speeches which are found as a result of the matching to be overlapping in data items necessary for execution of the application program; and linking the selected result of speech recognition with the results of recognition of plural speeches which are found as a result of the matching not to be overlapping in data items necessary for executing the application program.

A speech recognition system pertaining to an eighth invention is directed to a speech recognition system of the seventh invention, comprising a processor capable of performing the operations of calculating an evaluation value representing a degree of coincidence with a speech pattern; outputting a character sequence having a largest calculated evaluation value, and selecting a result of speech recognition having the largest evaluation value among overlapping results of recognition of plural speeches.

A speech recognition system pertaining to ninth or tenth invention is directed to a speech recognition system of the seventh or eighth invention, comprising a processor capable of performing the operation of preferentially selecting a result of recognition of a speech uttered later.

A speech recognizing system pertaining an eleventh invention is directed to any of the seventh to the tenth invention, comprising a processor capable of performing the operations of storing a priority level showing a priority in selection of a result of speech recognition for each speaker or specifying a priority level in order of utterance, and selecting a result of speech recognition of a speech uttered by a speaker with a higher priority level.

A speech recognizing system pertaining to a twelfth invention is directed to any of the seventh to the eleventh invention, comprising a processor capable of performing the operations of separating received speeches according to the respective speakers.

A speech recognition method pertaining to a thirteenth invention is directed to a speech recognition method for receiving speeches of plural speakers to execute a predetermined application program based on results of speech recognition of the received speeches, comprising the following steps of matching results of recognition of speeches with data items necessary for executing the application program; selecting one of results of recognition of plural speeches which are found as a result of the matching to be overlapping in a data item necessary for execution of the application program; and linking a selected result of speech recognition with the results of recognition of plural speeches which are found as a result of the matching not to be overlapping in data items necessary for executing the application program.

A speech recognition method pertaining to a fourteenth invention is directed to a speech recognition method of the thirteenth invention, comprising the steps of in a case where results of recognition of plural speeches overlapping in data items necessary for executing the application program are selected, calculating an evaluation value representing a degree of coincidence with a speech pattern stored in advance; outputting a character sequence having a largest calculated evaluation value, and selecting a result of speech recognition having the largest evaluation value among overlapping results of recognition of plural speeches.

A speech recognition method pertaining to a fifteenth invention is directed to a speech recognition method of the thirteenth invention, comprising the step of storing a priority level indicating a priority in selection of a result of speech recognition for each speaker or specifying a priority level in order of speech delivery, and preferentially selecting a result of speech recognition of a speech uttered by a speaker with a higher priority level.

A speech recognition method pertaining to sixteenth inventions is directed to a speech recognition method of the thirteenth invention, comprising the steps of separating received speeches according to the respective speakers.

A storage medium pertaining to a seventeenth invention is directed to a storage medium storing a computer program for a computer which receives speeches of plural speakers and executes a predetermined application program based on results of recognition of the received speeches, the computer program comprising the steps of: causing the computer to speech-recognize received speeches of individual speakers; causing the computer to match results of recognition of speeches with data items necessary for executing the application program; causing the computer to select one of results of recognition of plural speeches which are found as a result of the matching to be overlapping in a data item necessary for executing the application program; and causing the computer to link the selected result of speech recognition with the results of recognition of plural speeches which are found as a result of the matching not to be overlapping in data items necessary for executing the application program.

A storage medium pertaining to an eighteenth invention is directed to a storage medium of the seventeenth invention, the computer program comprising the further steps of: causing the computer to calculate an evaluation value representing a degree of coincidence with a speech pattern; causing the computer to output a character sequence having a largest calculated evaluation value; and causing the computer to select a result of speech recognition having the largest evaluation value among results of recognition of overlapping plural speeches.

A storage medium pertaining to a nineteenth or twentieth invention is directed to a storage medium of the seventeenth or eighteenth invention, comprising the further step of causing the computer to separate received speeches according to the respective speakers.

In the first, seventh, thirteenth and seventeenth inventions, speeches delivered by plural speakers are received and received speeches are speeches recognized for individual speakers. The results of speech recognition for individual speakers are matched with data items necessary for executing an application program, one of results of recognition of plural speeches which are found as a result of the matching to be overlapping in a data item necessary for executing the application program is selected, and results of recognition of plural speeches which are found as a result of the matching not to be overlapping in data items necessary for executing the application program is linked to the one selected result of speech recognition. With such operations applied, a single application program can be executed based on one data constructed by selecting one of overlapping results of speech-recognition of speeches inputted by plural speakers to link to the non-overlapping results of speech recognition, thereby enabling a single application program to be sharable among speakers.

In the second, eighth, fourteenth and eighteenth inventions, a character sequence having a largest evaluation value representing degree of coincidence with a speech pattern is outputted as a result of recognition and a result of speech-recognition having the largest evaluation value among results of recognition of overlapping plural speeches is selected. Thereby, in a case where results of speech-recognition of speeches inputted by plural speakers are overlapping on one another in the same data item, a result of speech recognition having the largest evaluation value for each speaker is selected to execute an application program, With such operations adopted, by selecting a result of speech-recognition having the largest evaluation value among results of speech-recognition of plural speakers, an application program can be executed based on results of speech-recognition which are most unlikely to cause wrong recognition, thereby enabling an application program to be executed without wrong recognition even in a case where speeches by plural speakers are simultaneously inputted.

In the third, fourth, ninth and tenth inventions, a result of recognition of a speech, which is an object for speech recognition, uttered at latest timing is preferentially selected. Thereby, in a case where plural speakers input speeches of the same contents, the person who inputs the last speech can input the most correct speech by correction or the like; therefore, by preferentially selecting a speech that is uttered last, an application program can be executed without wrong recognition.

In the fifth, eleventh and fifteenth invention, a priority level indicating a priority in selection of a result of speech recognition for each speaker is stored or a priority level is specified in order of utterance and a result of speech-recognition of a speech uttered by a speaker with a higher priority level is preferentially selected. Thereby, in a case where plural speakers input speeches of the same contents, a speech of a speaker with a higher priority level is preferentially selected; thereby enabling an application program to be executed without wrong recognition.

In the sixth, twelfth, sixteenth, nineteenth and twentieth inventions, even in a case where speeches of plural speakers are almost simultaneously received, the speeches of respective speakers can be speech-recognized by separating the received speeches according to the respective speakers and a single application program can be executed based on one data obtained by linking or, selecting one of, results of speech recognition of speeches inputted by plural speakers, thereby enabling a single application to be made sharable among the plural speakers in execution.

According to the first, seventh, thirteenth and seventeenth inventions, a single application program can be executed based on one data obtained by selecting one of overlapping results of speech-recognition of speeches inputted by plural speakers and linking the selected result to non-superimposed results, thereby enabling a single application to be made sharable among the plural speakers in execution.

According to the second, eighth, fourteenth and eighteenth inventions, in a case where results of speech recognition of speeches inputted by plural speakers are overlapping on one another in the same data item, a result of speech recognition on an individual speaker having the largest evaluation value is selected to execute an application program. In this way, by selecting a result of speech recognition having the largest evaluation value among results of recognition of speeches by plural speakers, an application program can be executed based on results of speech recognition which are most unlikely to cause wrong recognition, which makes it possible to execute an application program without wrong recognition even in a case where speeches by plural speakers are simultaneously inputted.

According to the third, fourth, ninth and tenth inventions, in a case where plural speakers input the same contents, the person who input the last speech can input the most correct speech by correction or the like; therefore, by preferentially selecting a speech uttered last, an application program can be executed without wrong recognition.

According to fifth, eleventh and fifteenth invention, in a case where plural speakers input the same contents, a speech of a speaker with a higher priority level is preferentially selected, thereby enabling an application program to be executed without wrong recognition.

According to sixth, twelfth, sixteenth, nineteenth and twentieth inventions, even in a case where speeches of plural speakers are almost simultaneously received, the speeches separated according to the respective speakers can be speech-recognized and a single application program can be executed based on one data obtained by linking or, selecting one of, results of speech recognition of speeches inputted by plural speakers, thereby enabling a single application program to be made sharable among the plural speakers in execution.

The above and further objects and features of the invention will more fully be apparent from the following detailed description with accompanying drawings.

BRIEF DESCRIPTION OF THE SEVERAL VIEWS OF THE DRAWINGS

FIG. 4 is tables showing an example of evaluation values of results of speech recognition on data items [the arrival point] and [the passage point], respectively.

DETAILED DESCRIPTION OF THE INVENTION

The conventional speech recognition apparatus disclosed in Japanese Patent Application Laid-Open No. 2001-005482 can be, as described above, can execute an application program based on a speech of a specified speaker by identifying a direction of the speaker with a microphone array, and the execution can be effected only by a speech of the specified speaker but not by a speech of a speaker other than the specified one. Therefore, there has remained a problem that one application program cannot be made sharable in execution among plural speakers.

The conventional car-mounted speech recognition apparatus disclosed in Japanese Patent Application Laid-Open No. 2003-114699 can execute an application program for each speaker even in a case where plural speakers simultaneously speak. However it only executes an application program for each speaker independently of the others, so that there has been a problem that a common application program can not be executed in a shared manner among plural speakers.

The invention has been made in light of such circumstances and it is an object of the invention to provide a speech recognition system, a speech recognition method and a storage medium capable of, even in a case where plural speakers input superimposed speeches, recognizing a speech of an individual speaker and making a single application program sharable among the speakers, which can be realized by an embodiment below.

Figure 1:
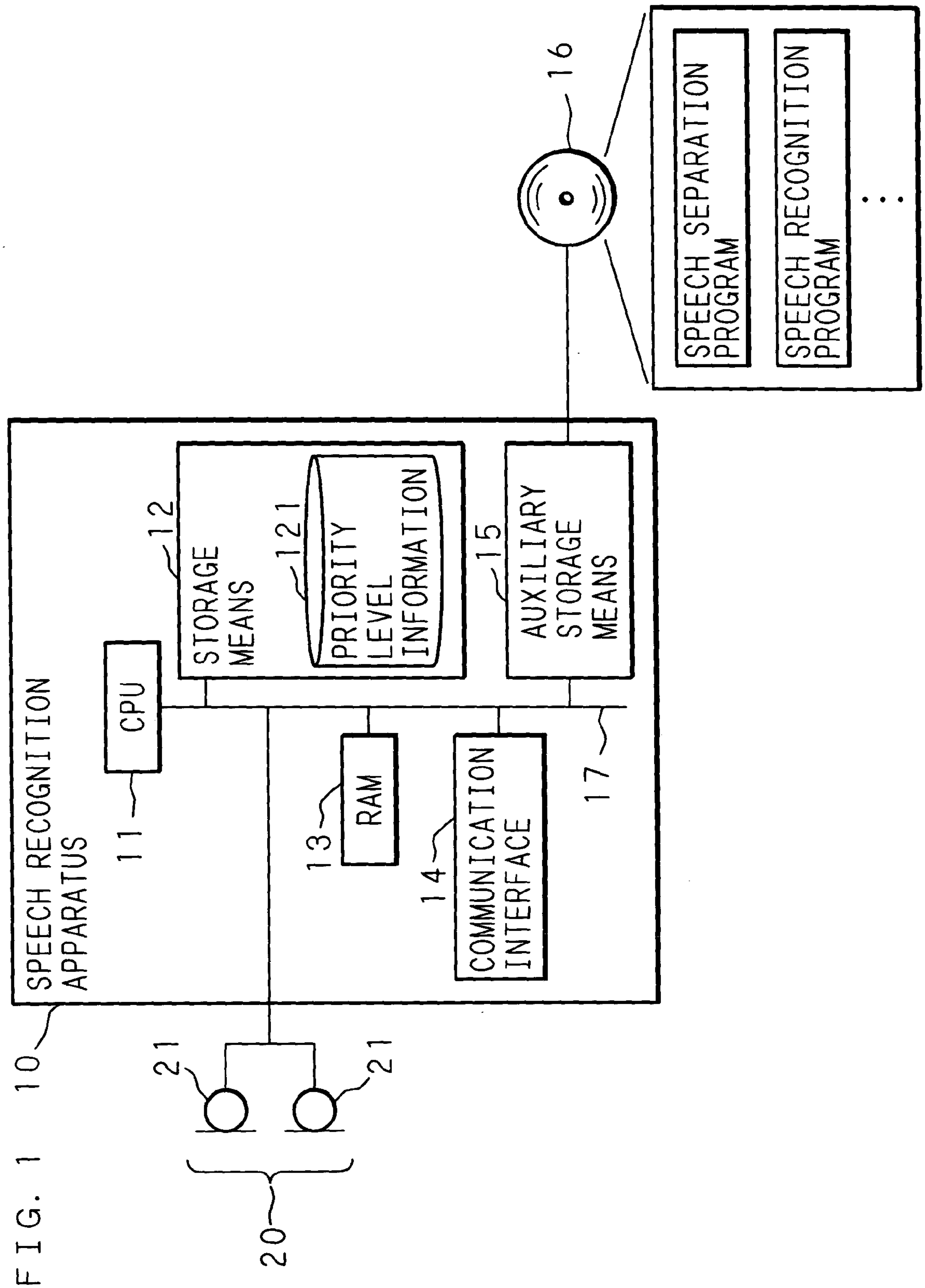
FIG. 1 is a block diagram showing a configuration of a speech recognition system pertaining to an embodiment of the invention.

FIG. 1 is a block diagram showing a configuration of a speech recognition system pertaining to an embodiment of the invention. A speech recognition system pertaining to the embodiment, as shown in FIG. 1, receives speeches of plural speakers with a speech input apparatus 20 constituted of plural microphones and includes a speech recognition apparatus 10 for recognizing the received speeches. Note that the speech input apparatus 20 is not specifically limited to a plural microphones and for example, any type of equipment may be of service, such as plural telephone lines and a gadget to which plural speech can be inputted.

The speech recognition apparatus 10 includes: a CPU (Central Processing Unit) 11; storage means 12; a RAM 13; a communication interface 14 connected to external communication means; and auxiliary storage means 15 using a portable storage medium 16 such as a DVD or a CD.

The CPU 11 is connected to hardware members as described above of the speech recognition apparatus 10 through an internal bus 17 and not only controls the hardware members but also performs various kinds of software functions according to processing programs stored in the storage means 12, including, for example, a program for receiving speeches of plural users and separating the speeches according to the respective speakers if necessary, a program for recognizing a speech of a particular speaker; and a program for generating data to be outputted to an application program based on a result of speech recognition.

The storage means 12 is constituted of a built-in fixed type storage apparatus (hard disk), a ROM and the like, and stores processing programs necessary for making the speech recognition apparatus 10 function, obtained from an external computer through the communication interface 14, or the portable storage medium 16 such as a DVD or a CD-ROM. The storage means 12 stores not only the processing programs, but also an application program to be executed using data generated based on results of recognition of a speech.

The RAM 13 is constituted of DRAM and the like, and stores temporary data generated during execution of a software. The communication interface 14 is connected to the internal bus 17 and connected so that the speech recognition apparatus 10 can communicate with an external network, thereby enabling data necessary for processing to be sent or received.

The speech input apparatus 20 includes: plural microphones 21, 21 . . . , and, a microphone array is constituted of at least two microphone 21 and 21, for example. The speech input apparatus 20 has a function of receiving speeches of plural speakers and sending speech data converted therein from the speeches to the CPU 11.

The auxiliary storage means 15 uses the portable storage medium 16 such as a CD or a DVD and downloads a program, data and the like to be executed or processed by the CPU 11 to the storage means 12. It is also possible to write data processed by the CPU 11 thereinto for backup.

Note that in the embodiment, description will be given of the case where the speech recognition apparatus 10 and the speech input apparatus 20 are integrally assembled into, but the construction is not limited to this, and the speech input apparatus 20 may be in a state where plural speech recognition apparatuses 10, 10 . . . , are connected to one another through a network or the like. No necessity arises for plural microphones 21, 21 . . . to be disposed in the same place and plural microphones 21, 21 . . . , disposed remotely from one another may be connected to one another through a network or the like.

The speech recognition apparatus 10 of a speech recognition system pertaining to the embodiment of the invention is placed in a wait sate for speech input from plural speakers. Naturally, in order to prompt an input of a speech by a speaker, a speech output may be allowed from the speech input unit 20 by a command of the CPU 11 according to an application program stored in the storage means 12. In this case, a spoken instruction to prompt a speech input by a speaker is outputted, such as, for example, "please input a start point and an arrival point in a format, from xx to yy."

In a case where speeches of plural speakers are received through the speech input apparatus 20 such as a microphone array, the CPU 11 of the speech recognition apparatus 10 detects the directivity of a received speeches and separates a speech in a different direction as a speech of a different speaker. The CPU 11 stores separated speeches in storage means 12 and the RAM 13 as data showing waveform data for each speaker or a characteristic quantity as a result of acoustic analysis on a speech and performs speech recognition on a speech data for each speaker stored in the RAM 13. No specific limitation is placed on a speech recognition engine to be used in speech recognition processing and any kind of commonly used speech recognition engine may be adopted. A speech recognition grammar specific to an individual speaker is adopted, thereby improving a precision in speech recognition greatly.

Note that the storage means 12 is not specifically limited to a built-in hard disc and may be any storage media capable of storing a great volume of data such as a hard disc built-in another computer connected thereto by way of the communication interface 14.

An application program stored in the storage means 12 is a load module of a speech recognition program and data input is performed by a speech through the speech input apparatus 20. Hence, the CPU 11 determines whether or not, when a speech is inputted by a speaker, all the data items of data specified by the application program is filled out as a result of speech recognition.

In a case where a single input of a speech is made, CPU 11 determines whether or not all the data items are filled out and has only to execute an application program, only if it is determined that all the data items are filled out. In a case where speeches of plural speakers can arbitrarily be received, there could be a data item in which speeches of plural speakers are superimposed. Moreover, a case also arises where all the data items are not filled out with a speech of a single speaker and can be filled out only after combining the speech with a speech of another speaker, so that an application program can be executed.

Figure 2:
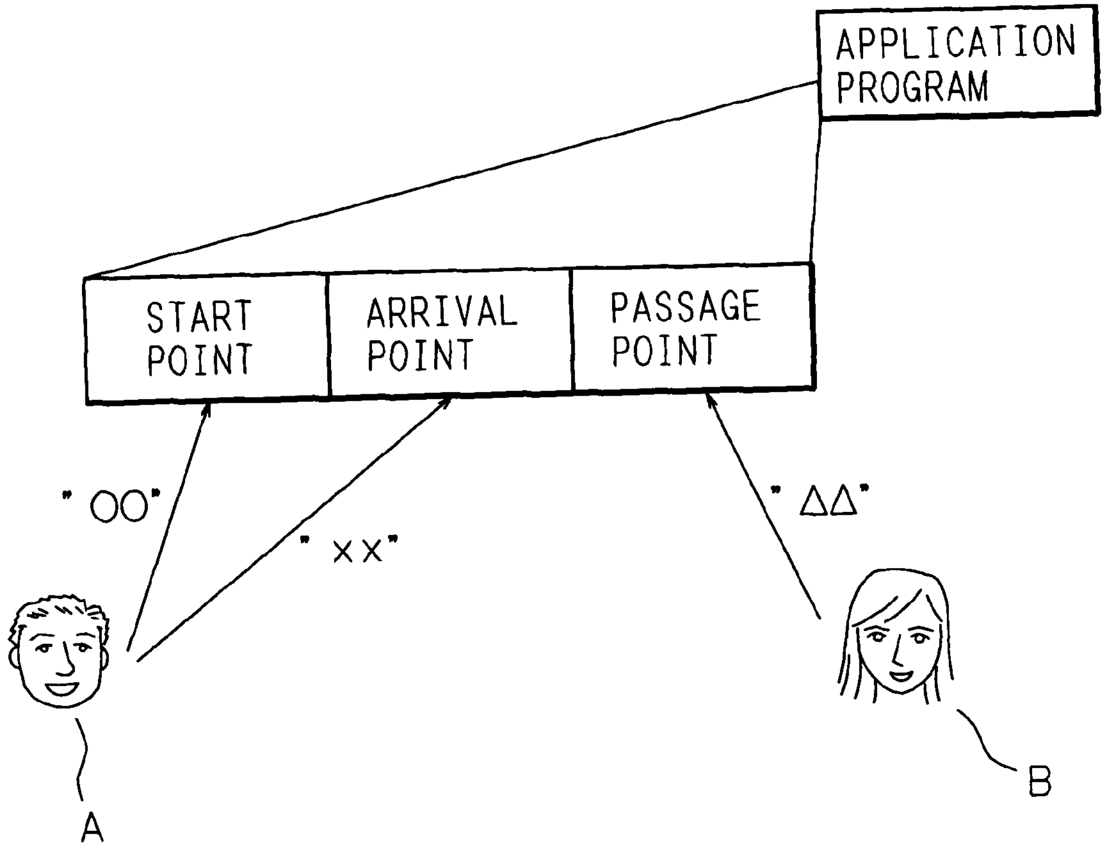
FIG. 2 is a model view showing an example of processing for linking results of speech recognition of plural speeches together.

First of all, description will be given of operations in a case where the CPU 11 receives speeches of plural speakers, all the data items are not filled out by a speech of a single speaker and all the data items are filled out only after combining the speech with a speech of another speaker, thereby enabling an application program to be executed. FIG. 2 is a model view showing an example of processing for linking results of speech recognition of plural speeches.

The example of FIG. 2 is an application program for a car navigation system program teaching a route from "○○" to "××" via "ΔΔ" and when it is confirmed to have received the start point "○○", the arrival point "××" and a passage point "ΔΔ" by speech recognition of a speech of a speaker, a rout that meets the conditions is displayed.

For example, when a driver A utters a speech "from Ohkubo station to Osaka station", the CPU 11 receives the speech through the speech input apparatus 20 (a microphone array) constituted of plural microphones 21, 21 . . . . The CPU 11 extracts a target speech signal from the received speeches and estimates a direction toward the speaker. The CPU 11 specifies the speaker based on the speech signal and the estimated direction toward the speaker and performs speech recognition processing based on the speech recognition grammar particular to the specified speaker to output the start point "Ohkubo station" and the arrival point "Osaka station" as a result of speech recognition. Note that it can be determined that the inputted speech includes the start point and the arrival point only by detecting the prepositions "from" and "to" as a result of speech recognition. Naturally, the construction is not specifically limited to such a method.

Thereby, the start point "Ohkubo station" and the arrival point "Osaka station" can be sufficiently filled out as a result of speech recognition. Reception of the passage point "ΔΔ", however, cannot be recognized, which disables execution of the application program.

Then, for example, a fellow passenger B taking the passenger seat utters a speech "via Sannomiya". In this case, the CPU 11 receives the speech through the speech input apparatus 20 (a microphone array) constituted of plural microphones. The CPU 11 extracts a speech signal as a target from the received speeches and estimates a direction toward a speaker. The CPU 11 specifies the speaker based on a speech signal and the estimated direction toward the speaker and performs a speech recognition processing based on a speech recognition grammar particular to the specified speaker to output the passage point "Sannomiya" as a result of the speech recognition. Note that it is determined that the inputted speech includes the passage point only by detecting the preposition [via] as a result of the speech recognition. Naturally, the construction is not specifically limited to this method.

Therefore, the passage point "Sannomiya" can be filled out the result of speech recognition. Reception of the start point "○○" and the arrival point "××" cannot be recognized, however, which disables execution of an application program to be performed.

The CPU 11 links the start point "Ohkubo station" and the arrival point "Osaka station" outputted based on the speech of the driver A to the passage point "Sannomiya" as the result of speech recognition outputted based on the fellow passenger B in the assistant driver's seat to form a single input for a single application program. Thereby, an application program that cannot be executed by a single speaker is made executable by linking results of speech recognition of speeches of plural speakers.

Figure 3:
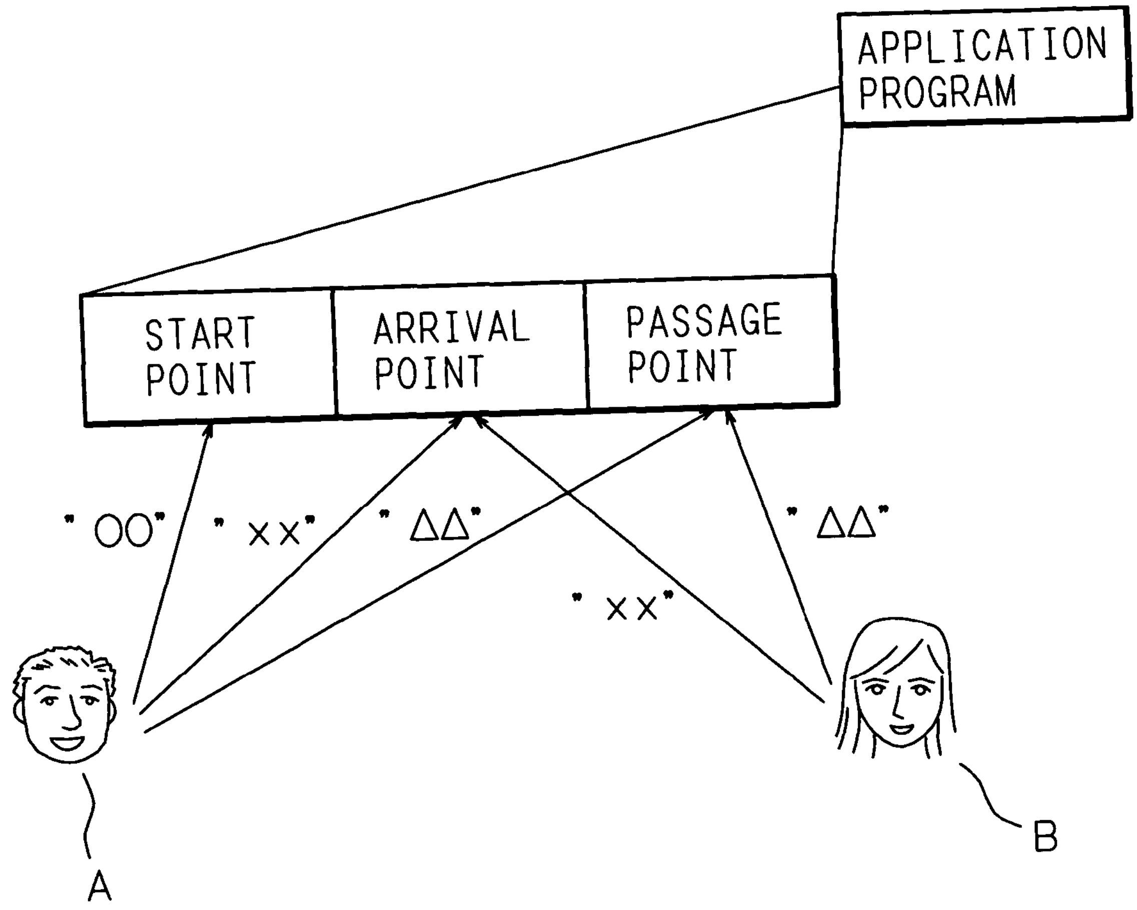
FIG. 3 is a model view showing an example of processing for selecting results of speech recognition of plural speeches.

Then, description will be given of operations in a case where the CPU 11 receives speeches of plural speakers and there are data items in which received speeches of plural speakers are superimposed on one another. FIG. 3 is a model view showing an example of processing for selecting results of speech recognition of plural speeches.

In the example of FIG. 3, there is shown an application program for a car navigation system teaching a route from "○○" to "××" via "ΔΔ" and the route satisfying the conditions is displayed when it is confirmed to have received the start point "○○", the arrival point "××" and the passage point "ΔΔ" by speech recognition of speeches of the speakers.

For example, in a case where a driver A utters a command "from Ohkubo station to Osaka station via Sannomiya", the CPU 11 receives the speech through the speech input apparatus 20 (a microphone array) constituted of plural microphones 21, 21 . . . . The CPU 11 extracts a target speech signal from the received speech and estimates a direction toward a speaker. The CPU 11 specifies the speaker based on the speech signal and the estimated direction toward the speaker, and perform a speech recognition processing based on a speech recognition grammar particular to the specified speaker to thereby output the start point "Ohkubo station", the arrival point "Osaka station" and the passage point "Sannomiya" as a result of the speech recognition. Note that it is determined that the inputted speech includes the start point, the arrival point and the passage point only by detecting prepositions "from", "to" and "via" as a result of the speech recognition. Needless to say the construction is not specifically limited to this method.

A speech label including the start time and end time of a separated speech of each speaker may be attached to give a priority level to the speech, or alternatively, a speaker label may be attached to a speaker to give a priority level to the speaker and to thereby, attach a priority level to a result of the speech recognition. In a case where a microphone array is used as the speech input apparatus 20 as in the embodiment, speeches are separated by specifying directions toward respective speakers, while speeches are unnecessary to be separated according to the respective speakers in a case where the speeches are inputted to separate microphones.

With such a construction adopted, since the start point [Ohkubo station], the arrival point "Osaka station" and the passage point "Sannomiya" can be obtained on the basis of the speech recognition, an application program can be executed. If the fellow passenger B on the passenger seat, however, utters a speech "via Nishi-Akashi to Shin-Osaka" before executing the application program, the CPU 11 receives such a speech with the speech input apparatus 20 (a microphone array) constituted of plural microphones 21, 21 . . . . The CPU 11 extracts a target speech signal from the received speeches to estimate a direction toward a speaker. The CPU 11 specifies the speaker based on the speech signal and the estimated direction toward the speaker, performs a speech recognition processing based on a speech recognition grammar particular to the specified speaker to output the arrival point "Shin-Osaka station" and the passage point "Nishi-Akashi" as results of the speech recognition. Note that it is determined that the inputted speech includes the arrival point and the passage point is only by detecting prepositions "to" and "via" as a result of the speech recognition. Needless to say that the construction is not specifically limited to this method.

Thereby, there arise plural results of speech recognition on the arrival point and the passage point, and the CPU 11 performs a processing to select one result for each point. For example, the CPU 11 extracts evaluation values in speech recognition on character sequences outputted as respective results of speech recognition for data items and selects a result of the speech recognition with a high evaluation value for each data item.

FIG. 4 are tables showing an example of evaluation values as results of speech recognition for data items [the arrival point] and [the passage point], respectively. FIG. 4(*a*) shows evaluation values of a data item [the arrival point], while FIG. 4(*b*) shows evaluation values of a data item [the passage point].

In the example of FIG. 4, a speech recognition result of "Shin-Osaka" is higher in evaluation value with respect to a data item "the arrival point" while a speech recognition result of "Nishi-Akashi" is higher in evaluation value with respect to a data item "the passage point". Therefore, the CPU 11 selects the arrival point "Shin-Osaka" and the passage point "Nishi-Akashi".

A method for selecting a speech recognition result is not specifically limited to a method based on an evaluation value of a result of speech recognition but may be a method for selecting a result of speech recognition on a speech to be subject to speech recognition which is uttered at the latest timing. That is, in a case where plural speakers input more than once with respect to a same data item, a speech inputted at the latest timing is most likely to be correct in the contents.

The CPU 11 extracts a target speech signal from a received speech and estimates a direction toward a speaker, thereby enabling the speaker to be specified. Hence, a method may be adopted in which information on priority levels with which a speech recognition result is selected for each speaker is stored in the storage means 12 in advance as priority level information 121 and a result of speech recognition related to a speech of a speaker with a highest priority is selected among overlapping results of speech recognition. Another method may be adopted in which a priority level is designated in the order of speaking, for example, in which a speaker who speaks first is assigned with a highest priority level.

Figure 5:
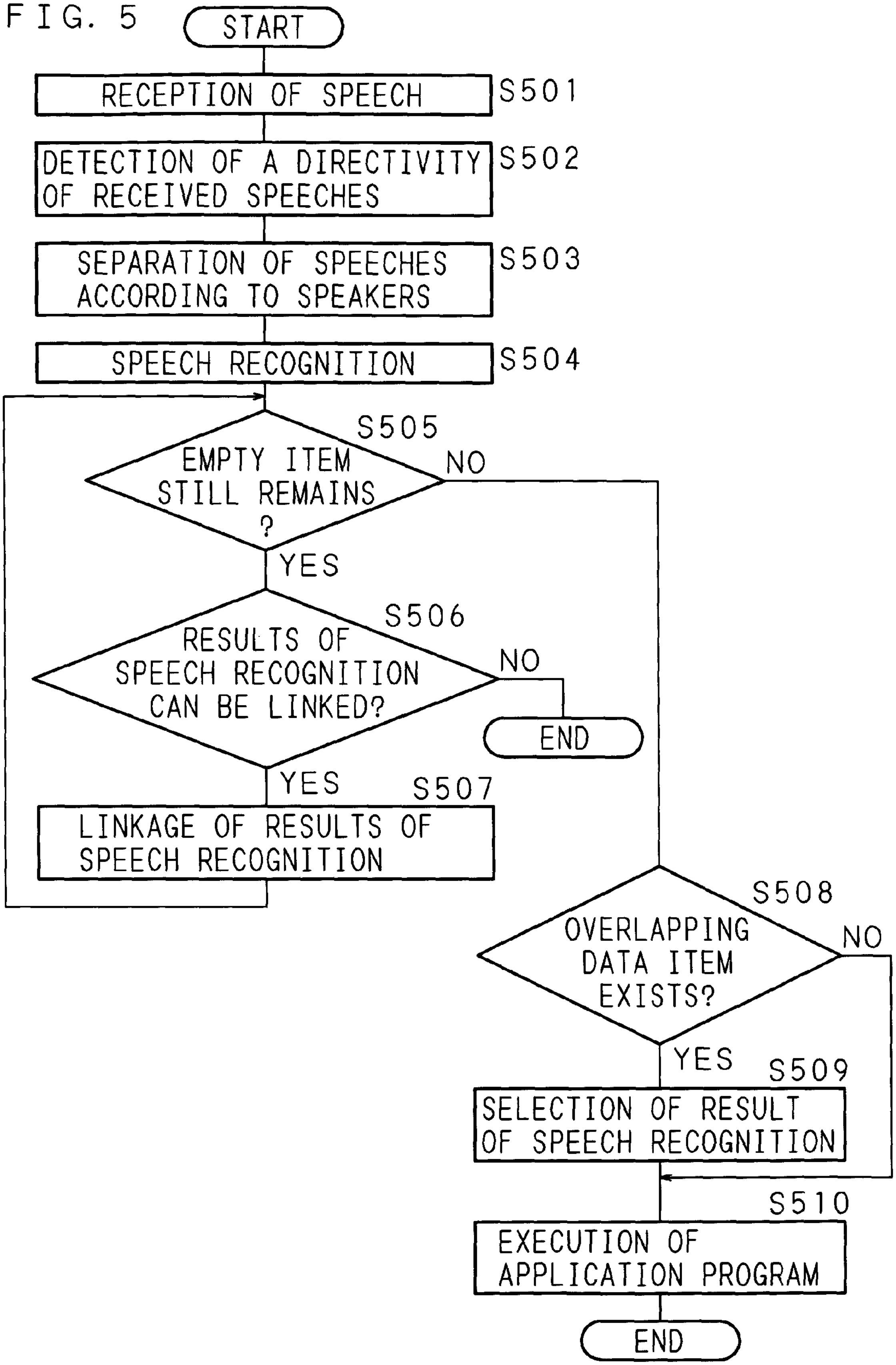
FIG. 5 is a flowchart showing a procedure for processing executed in a CPU of a speech recognition apparatus of a speech recognition system pertaining to the embodiment of the invention.

FIG. 5 is a flowchart showing a procedure for processing in the CPU 11 of a speech recognition apparatus 10 for a speech recognition system pertaining to the embodiment of the invention. The CPU 11 of the speech recognition apparatus 10 receives speeches from the speech input apparatus 20 (step S501), detects the directivity of each received speech (step S502) and separates the received speeches into speeches of different speakers on the basis of the directions of the speeches (step S503). The CPU 11 converts separated speeches to speech data such as waveform data of each speaker and data showing a characteristic quantity as a result of an acoustic analysis of a speech and performs speech recognition on each separated speakers (step S504). No specific limitation is placed on a speech recognition engine used in speech recognition processing and any of speech recognition engines commonly used may be used. A speech recognition grammar for each speaker, when being used, improves a precision in speech recognition greatly.

The CPU 11 fills out data items necessary for executing an application program based on a result of speech recognition on one speaker and determines whether or not an empty data item or empty data items still remain without being filled out (step S505). The CPU 11, when having determined that an empty data item still remains (YES in step S505), further determines whether or not the result of speech recognition of one speaker can be linked to a result of speech recognition on another speaker (step S506). To be concrete, the CPU 11 determines whether or not a result of speech recognition that can fill out the empty data item is available in a result of speech recognition on another speaker.

When the CPU 11 determines that the result of speech recognition on the one speaker cannot be linked to the result of speech recognition on another speaker (NO in step S506), the CPU 11 determines that a data item or data items necessary for execution of an application program cannot be filled out and then terminates the processing. When the CPU 11 determines that the result of speech recognition on the one speaker can be linked to the result of speech recognition on another speaker (YES in step S506), the CPU 11 links the results of speech recognition thereof together (step S507) and the process returns to step S505.

When the CPU 11 determines that no empty data item exists (NO in step S505), the CPU 11 determines whether or not a data item with overlapping speech recognition results exists (step S508). When the CPU 11 determines that a data item with overlapping speech recognition results exists (YES in step S508), the CPU 11 selects one of the results of speech recognition in the data item with overlapping speech recognition results (step S509), thereby fill out all the data items and execute an application program in a state where no data item with overlapping speech recognition results exists (step S510).

According to the embodiment, as described above, speeches uttered by plural speakers are received, results of speech recognition on individual speakers are matched with data items necessary for executing an application program, as a result of the matching, results of speech recognition which are not overlapping as data to fill up the data items necessary for executing an application program are linked together, while one result of speech recognition are selected when plural results of speech recognition are overlapping, so that a single application program can be executed, thereby enabling a single application program to be executed in a sharable manner by plural speakers.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A speech recognition system comprising:

an input part for receiving speeches from each of plural speakers;

a speech recognition part for speech-recognizing a speech received from each of the plural speakers;

a matching part for matching the results of speech recognition with data items necessary for executing an application program;

a selecting part for selecting one of the results of recognition of plural speeches which are found as a result of the matching to be overlapping in a data item necessary for executing the application program as a result of the matching; and a linkage part for linking the selected result of speech recognition the results of recognition of the plural speeches which are found as results of the matching not to be overlapping in data items necessary to execute the application program based on the linked results of speech recognition, wherein a priority level showing a precedence of speech of one speaker over speech of another speaker in selection of a result of speech recognition for each speaker is stored, the selecting part preferentially selects a result of speech recognition of a speech uttered by a speaker with a highest priority level, the priority level being stored in advance of the speech recognition, based on a result of speech recognition of one speaker, it is determined as to whether or not an empty data item exists among data items necessary for execution of an application program, when it is determined that there is an empty data item, it is determined as to whether or not the result of speech recognition of the one speaker can be linked to a result of speech recognition on another speaker, and linking the result of speech recognition of the one speaker to the result of speech recognition on another speaker when it is determined to be possible.

2. The speech recognition system of claim 1, wherein the speech recognition part calculates an evaluation value representing a degree of coincidence with a speech pattern stored in advance and outputs a character sequence having a largest calculated evaluation value as a result of recognition, and the selecting part selects a result of speech recognition having the largest evaluation value among overlapping results of speech recognition of plural speeches.

3. The speech recognition system of claim 2, wherein the selecting part preferentially selects a result of speech recognition of a speech uttered later.

4. The speech recognition system of claim 1, wherein the selecting part preferentially selects a result of speech recognition of a speech uttered later.

5. The speech recognition system of claim 1, comprising speech separation part for separating received speeches according to the respective speakers.

6. A speech recognition system comprising a processor capable of performing:

receiving speeches from each of plural speakers;

speech-recognizing the received speeches;

matching results of speech recognition with data items necessary for executing an application program;

selecting one of results of recognition of plural speeches which are found as a result of the matching to be overlapping in a data item necessary for execution of the application program;

linking the selected result of speech recognition the results of recognition of plural speeches which are found as results of the matching not to be overlapping in data items necessary to execute the application program based on the linked results of speech recognition;

storing a priority level indicating a precedence of speech of one speaker over speech of another speaker in selection of a result of speech recognition for each speaker; and preferentially selecting a result of speech recognition of a speech uttered by a speaker with a higher priority level, the priority level being stored before the speech recognition;

based on a result of speech recognition of one speaker, determining as to whether or not an empty data item exists among data items necessary for execution of an application program, when it is determined that there is an empty data item, determining as to whether or not the result of speech recognition of the one speaker can be linked to a result of speech recognition on another speaker; and linking the result of speech recognition of the one speaker to the result of speech recognition on another speaker when it is determined to be possible.

7. The speech recognition system of claim 6, comprising a processor further capable of performing:

calculating an evaluation value representing a degree of coincidence with patterns stored in advance;

outputting a character sequence having a largest calculated evaluation value, and selecting a result of speech recognition having the largest evaluation value among overlapping results of recognition of plural speeches.

8. The speech recognition system of claim 7, comprising a processor further capable of performing:

preferentially selecting a result of recognition of a speech uttered later.

9. The speech recognition system of claim 6, comprising a processor further capable of performing:

preferentially selecting a result of recognition of a speech uttered later.

10. The speech recognition system of claim 6, comprising a processor further capable of performing:

separating received speeches according to the respective speakers.

11. A speech recognition method for causing a computer to function as a speech recognition system, the speech recognition method performed by the computer comprising steps of:

receiving speeches from each of plural speakers;

speech-recognizing the received speeches from each of the plural speakers;

matching results of speech recognition with data items necessary for executing an application program;

selecting one of results of recognition of plural speeches which are found as a result of the matching to be overlapping in a data item necessary for execution of the application program;

linking the selected result of speech recognition the results of recognition of plural speeches which are found as results of the matching not to be overlapping in data items necessary to execute the application program based on the linked results of speech recognition;

storing a priority level indicating a precedence of speech of one speaker over speech of another speaker in selection of a result of speech recognition for each speaker;

preferentially selecting a result of speech recognition of a speech uttered by a speaker with a higher priority level, the priority level being stored in advance of the speech recognition;

based on a result of speech recognition of one speaker, determining as to whether or not an empty data item exists among data items necessary for execution of an application program;

when it is determined that there is an empty data item, determining as to whether or not the result of speech recognition of the one speaker can be linked to a result of speech recognition on another speaker; and linking the result of speech recognition of the one speaker to the result of speech recognition on another speaker when it is determined to be possible.

12. The speech recognition method of claim 11, the application program further comprising:

in a case where results of recognition of plural speeches overlapping in data items necessary for executing the application program are to be selected, calculating an evaluation value representing a degree of coincidence with a speech pattern stored in advance;

outputting a character sequence having a largest calculated evaluation value, and selecting a result of speech recognition having the largest evaluation value among overlapping results of recognition of plural speeches.

13. The speech recognition method of claim 11, the application program further comprising:

separating received speeches according to the respective speakers.

14. A non-transitory computer-readable storage medium for a given application program causing a computer to function as a given speech recognition system, the application program causing the computer-to execute:

receiving speeches of plural speakers;

executing the speech recognition program based on results of recognition of the received speeches;

speech-recognizing the received speeches of individual speakers;

matching results of recognition of speeches with data items necessary to execute the application program;

selecting one of results of recognition of plural speeches which are found as a result of the matching to be overlapping in a data item necessary to execute the application program; and linking the selected result of speech recognition the results of recognition of plural speeches which are found as results of the matching not to be overlapping in data items necessary to execute the application program based on the linked results of recognition of the received speech, wherein a priority level showing a precedence of speech of one speaker over speech of another speaker in selection of a result of speech recognition for each speaker is stored, the selecting part preferentially selects a result of speech recognition of a speech uttered by a speaker with a highest priority level, the priority level stored in advance of the speech recognition, based on a result of speech recognition of one speaker, determining as to whether or not an empty data item exists among data items necessary for execution of an application program, when it is determined that there is an empty data item, determining as to whether or not the result of speech recognition of the one speaker can be linked to a result of speech recognition on another speaker, and linking the result of speech recognition of the one speaker to the result of speech recognition on another speaker when it is determined to be possible.

15. The non-transitory computer-readable storage medium of claim 14, storing the computer application program comprising:

calculating an evaluation value representing a degree of coincidence with a speech pattern stored in advance;

outputting a character sequence having a largest calculated evaluation value; and selecting a result of speech recognition having the largest evaluation value among overlapping results of recognition of plural speeches.

16. The non-transitory computer-readable storage medium of claim 14, the application program further comprising:

separating received speeches according to the respective speakers.

17. The non-transitory computer-readable storage medium of claim 15, the application program further comprising:

separating received speeches according to the respective speakers.

* * * * *